Patented July 21, 1953

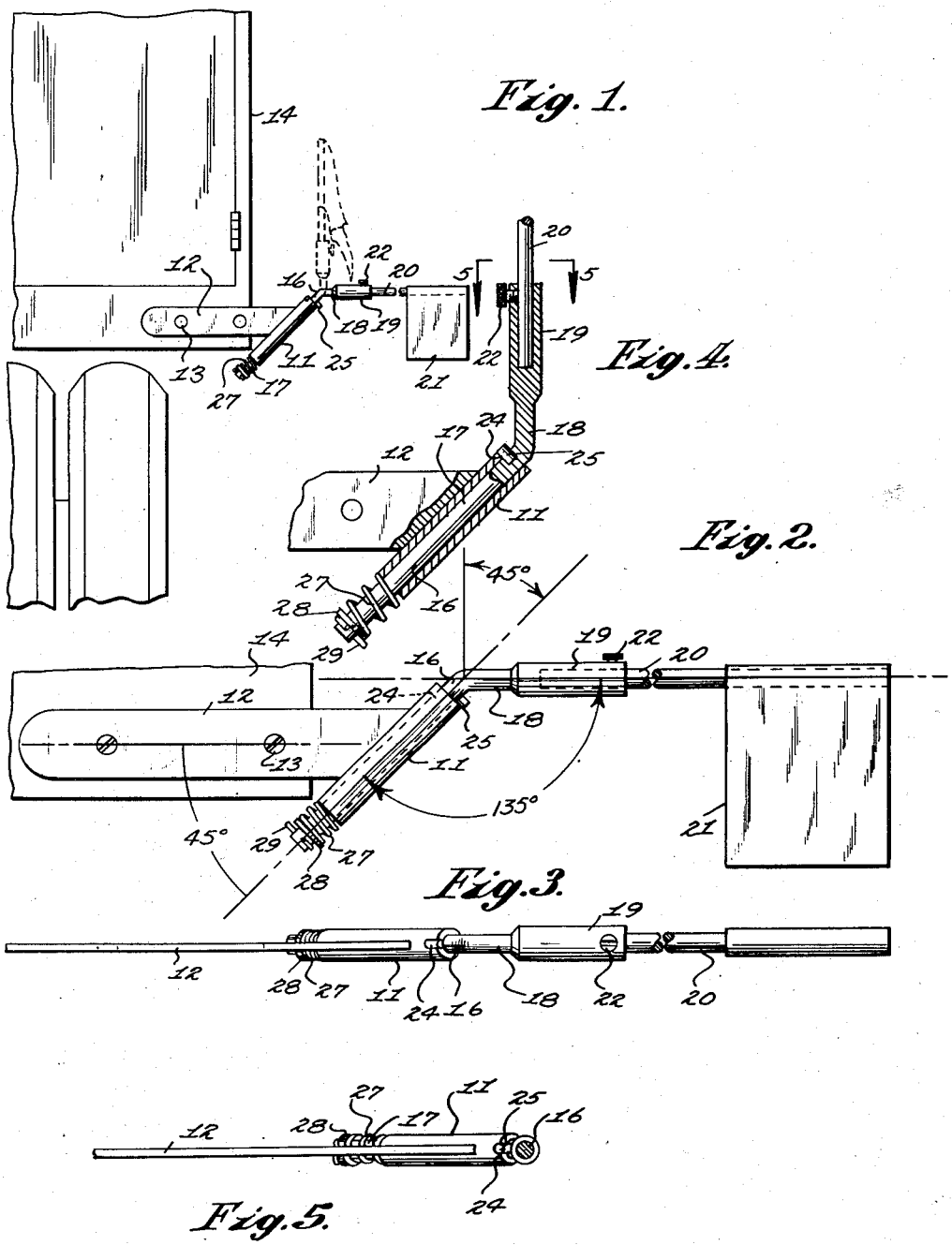

2,646,240

UNITED STATES PATENT OFFICE 2,646,240

FLAG HOLDER

Clarence N. Anderson, Northwood, Iowa

Application February 28, 1950, Serial No. 146,759

2 Claims. (Cl. 248—207)

This invention relates to flag holders generally considered, and more particularly to holders for danger and caution flags such as are commonly used on large trucks, road graders and the like to provide a visual warning signal for highway and similar traffic.

An object of the invention is to provide an improved holder for flags mounted on mobile units in which the flag is arranged to be held in a normally horizontally extended position and is adapted to be swung out of the way of any object in its path.

Another object of the invention is to provide a flag holder of the above type in which the flag may be held fixed in a vertical position when not in use as a danger signal-indicating means.

With these and other objects in view, the invention consists in the construction, arrangement and combination of the several parts of which it is composed, as will be hereinafter more fully described and claimed, reference being had to the accompanying drawing, in which:

Figure 1 is a rear elevation of a portion of an automotive vehicle, showing the application of the flag holder of the present invention thereto, the flag being shown by full lines in a normally horizontally disposed extended danger-indicating position and being shown by broken lines in a retracted substantially vertical position;

Figure 2 is an enlarged side elevation of the flag holder shown in Figure 1;

Figure 3 is a top plan view of the structure shown in Figure 2, the device being shown removed from its support;

Figure 4 is a side elevation, partly in vertical section, of a portion of the flag holder with the socket for the flagstaff in a vertical position; and Figure 5 is a horizontal section taken along the line 5—5 of Figure 4.

Referring to the drawing, the flag holder of the present invention comprises a bracket 11, in the form of an elongated, cylindrical body, open at both ends, and having an arm 12 projecting at an angle outwardly therefrom for mounting the bracket on a suitable support. In the present instance, the arm 12 of the bracket 11 is shown attached by suitable fastening elements 13 to the body 14 of an automotive vehicle. It will be understood, however, that the bracket 11 can be mounted on any other type of support when desired, other than the vehicle body herein shown.

As shown in Figure 2, in order to dispose the bracket 11 in the proper angular relationship with the support to which it is adapted to be affixed, so that the flagstaff will be substantially horizontally disposed when in an extended position, the arm 12 should be arranged substantially at an angle of 45° with the longitudinal axis of the bracket 11 and said arm should be mounted in a substantially horizontal position on the support.

A shaft 16 has a lower section 17 rotatably mounted within the bracket 11 and extending outwardly beyond the lower end of said bracket for a suitable distance, and an upper section 18 arranged at an oblique angle with respect to the lower section 17 thereof. The upper section 18 of the shaft 16 is formed with a tubular extension 19 constituting a socket for receiving an end of a flagstaff 20. The flagstaff may be of any length and may carry any type of flag 21 on its outer portion. The flagstaff 20 is detachably retained in position in the socket 19 by means of a set screw 22 or any other form of fastening means desired. Preferably the upper or outer section 18 of the shaft 16 is formed at an angle of 135° with respect to the lower section 17 of said shaft, so that when the shaft is mounted in the bracket 11 and arranged in the manner shown in Figure 2, the section 18 of said shaft will have its longitudinal axis arranged in substantially parallel relationship with respect to the longitudinal axis of the arm 12. Since the shaft 16 is rotatably mounted in the bracket 11, it can be turned through an angle of approximately 180° to swing the upper section 18 thereof from the horizontal position shown in full lines, Figure 1, to the vertical dotted line position therein shown.

In order to retain the flagstaff 20 in a vertical position, so that the flag will clear narrow spaces, such as garage door openings and the like, the upper end portion of the bracket 11 is formed with a notch or slot 24, which extends downwardly in the wall of the bracket a suitable distance. A pin 25 is mounted in the lower section 17 of the shaft 16 and is so positioned thereon that when the flagstaff 20 is in the vertical position shown in Figure 4, the pin 25 will be disposed within the slot 24, thereby interlocking the shaft 16 with the bracket 11.

The lower downwardly extending portion of the shaft 16 has a coiled spring 27 mounted thereon. One end of the spring 27 bears against the lower end of the bracket 11 and the other end of said spring bears against a washer 28 mounted on the shaft 16 and detachably retained thereon by a cotter pin 29 carried by said shaft. The purpose of the spring 27 is to urge the shaft 16 downwardly of the bracket 11, so that when the pin 25 is disposed in the slot 24, accidental displacement of the shaft 16 with respect to the bracket 11 is prevented. When it is desired to arrange the flag in the horizontal position shown in Figure 2, shaft 16 should be moved lengthwise of the bracket 11 in order to withdraw the pin 25 from the slot 24. The shaft can then be turned to the desired position, the pin 25 riding on the end surface of the bracket 11, and being held frictionally thereon by the tension of spring 27. Since, in the normal position of the device shown in Figure 2, the shaft 16 is not directly connected with the bracket 11, the flagstaff is free to move relative to said bracket when the flag is horizontally disposed. Thus, should the horizontally extending flagstaff strike any object in its path of movement, it will readily swing away from such object and upon being released therefrom the flagstaff will return to its normal position by gravity, due to the weight of the flag mounted on the outer end thereof.

In view of the foregoing description taken in connection with the accompanying drawing, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having thus described my invention, what I claim and desire to secure by Letters Patent is:

1. In a holder for holding a flag staff in a perpendicular or horizontal position relative to a support, a bracket arm having an end adapted to be secured to a support with the bracket arm extending laterally and horizontally therefrom, a tubular body fixed intermediate its ends on the other end of said arm, said tubular body extending at an upward and laterally outward angle relative to said arm, said tubular body having a depressed end and an elevated end, a shaft having a first shaft portion rotatably and slidably engaged in said tubular body, said first shaft portion being longer than said tubular body and having a depressed end reaching below the depressed end of said tubular body, a lateral pin on the elevated end of said first shaft portion bearing against the elevated end of said tubular body, spring means acting between the depressed end of the tubular body and a part of the depressed end of said first shaft portion and serving to urge said pin toward the elevated end of said tubular body, a second shaft portion on the elevated end of said first shaft portion, said second shaft portion extending at an obtuse angle to the axis of said first shaft portion, said second shaft portion being formed with means for securing a flag staff thereto with the axis of the flag staff parallel to the axis of said second shaft portion, said shaft being rotatable relative to said tubular body to position the flag staff in an erect perpendicular position or in a horizontal position.

2. In a holder for holding a flag staff in a perpendicular or horizontal position relative to a support, a bracket arm having an end adapted to be secured to a support with the bracket arm extending laterally and horizontally therefrom, a tubular body fixed intermediate its ends on the other end of said arm, said tubular body extending at an upward and laterally outward angle relative to said arm, said tubular body having a depressed end and an elevated end, a shaft having a first shaft portion rotatably and slidably engaged in said tubular body, said first shaft portion being longer than said tubular body and having a depressed end reaching below the depressed end of said tubular body, a lateral pin on the elevated end of said first shaft portion bearing against the elevated end of said tubular body, spring means acting between the depressed end of the tubular body and a part of the depressed end of said first shaft portion and serving to urge said pin toward the elevated end of said tubular body, a second shaft portion on the elevated end of said first shaft portion, said second shaft portion extending at an obtuse angle to the axis of said first shaft portion, said second shaft portion being formed with means for securing a flag staff thereto with the axis of the flag staff parallel to the axis of said second shaft portion, said shaft being rotatable relative to said tubular body to position the flag staff in an erect perpendicular position or in a horizontal position and locking means acting between said lateral pin and the elevated end of said tubular body for locking said shaft only in a position wherein said second shaft portion is in erect perpendicular position.

CLARENCE N. ANDERSON.

References Cited in the file of this patent

UNITED STATES PATENTS

| Number | Name | Date |
| --- | --- | --- |
| 416,755 | Schoenike | Dec. 10, 1889 |
| 1,090,573 | Shaner | Mar. 17, 1914 |
| 1,273,098 | Schumann | July 16, 1918 |
| 2,174,140 | Schofield | Sept. 26, 1939 |
| 2,284,502 | Westrope | May 26, 1942 |
| 2,486,279 | Hathaway | Oct. 25, 1949 |
| 2,551,269 | Jestor | May 1, 1951 |